United States Patent [19]

Pavlovsky

[11] 4,221,514
[45] Sep. 9, 1980

[54] APPARATUS FOR TRIMMING WORKPIECES

[75] Inventor: Rudolf Pavlovsky, Schaffhausen, Switzerland

[73] Assignee: George Fischer Limited, Switzerland, Switzerland

[21] Appl. No.: 918,421

[22] Filed: Jun. 23, 1978

[30] Foreign Application Priority Data

Jul. 11, 1977 [CH] Switzerland .................. 8551/77

[51] Int. Cl.² .................. B23D 1/30; B23D 3/06
[52] U.S. Cl. .................. 409/291; 51/101 R; 144/144 R; 409/300
[58] Field of Search ........... 90/11 A, 11 C, 13.1–13.5, 90/24.3, 24.4, 24.5, 62 R; 51/100 R, 101 R, 165.91, 281 R, DIG. 33; 144/139, 144 R, 220; 408/11, 12, 127; 407/54, 56, 57; 409/291, 292, 293, 300, 318; 279/10

[56] References Cited

U.S. PATENT DOCUMENTS

| | | | |
|---|---|---|---|
| 2,297,611 | 9/1942 | Drummond | 407/57 |
| 2,574,016 | 11/1951 | Burg | 408/127 |
| 2,732,771 | 1/1956 | Kerns | 90/11 C X |
| 2,836,936 | 6/1958 | Lovely | 51/101 R |
| 3,289,717 | 12/1966 | Dutot | 407/56 X |
| 3,571,834 | 3/1971 | Mathias | 408/11 X |
| 3,602,090 | 8/1971 | Whetham | 90/11 A |
| 3,995,969 | 12/1976 | Fleming | 408/12 |

Primary Examiner—Z. R. Bilinsky
Attorney, Agent, or Firm—Roylance, Abrams, Berdo & Farley

[57] ABSTRACT

An automatic method of trimming portions of a workpiece such as a casting includes moving a trimming tool along the contour of the workpiece while imparting linear or rotary cutting motion to the tool, detecting the deflection of the tool as it follows the contour, and using signals representative of the deflection detection to control the contour-following tool motion. Apparatus for performing this method includes proximity detectors in the tool support or elastic deformation sensors such as strain gauges, in various embodiments. The tool itself acts as a pattern follower as well as the trimmer, using the workpiece as the pattern.

10 Claims, 9 Drawing Figures

Fig. 5
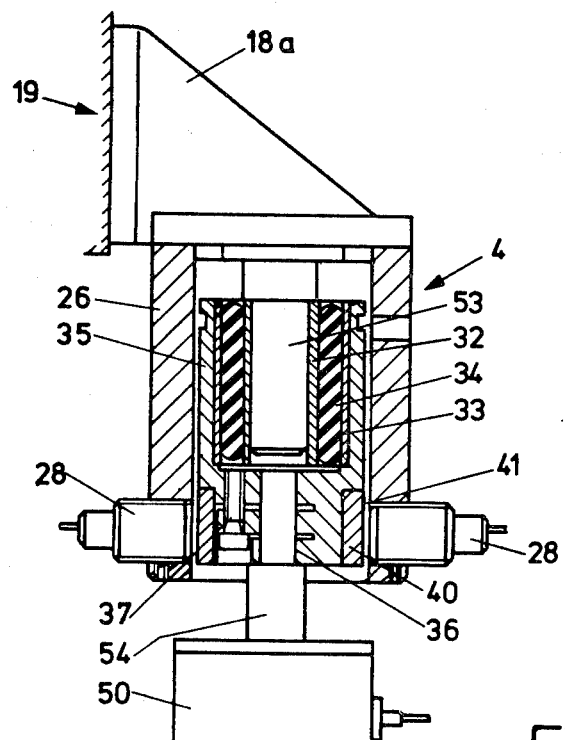
Fig. 6
Fig. 7
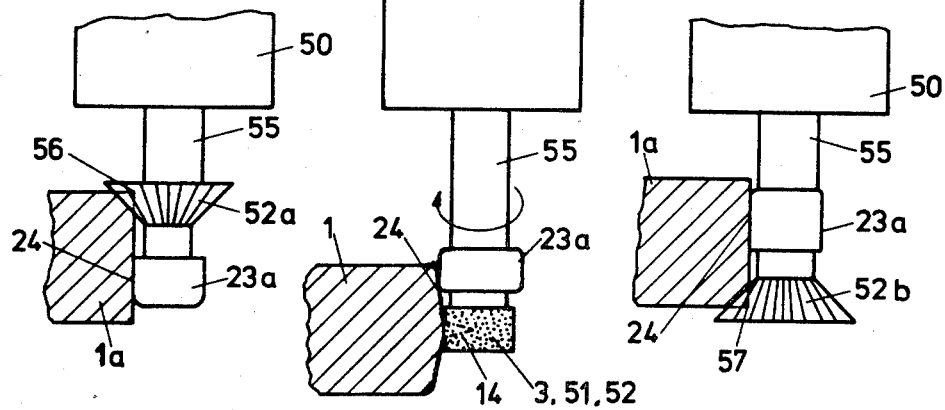

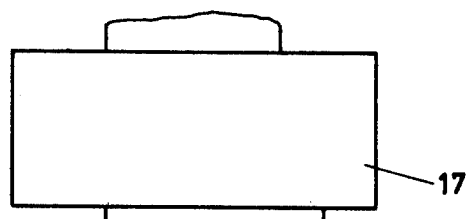
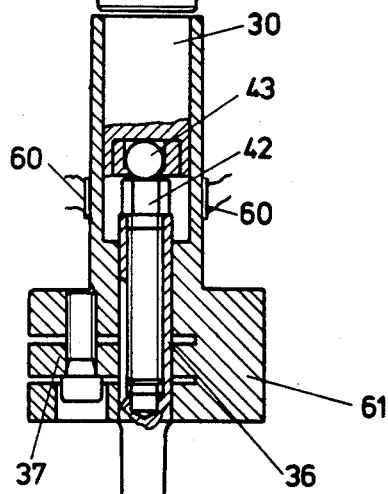
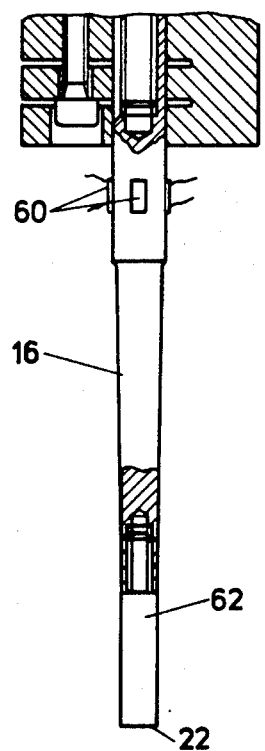

APPARATUS FOR TRIMMING WORKPIECES

This invention relates to a method and apparatus for trimming workpieces, particularly cast pieces, for cutting or trimming the burr or flashing therefrom which remains after the casting process.

BACKGROUND OF THE INVENTION

When a casting is produced, it is usually the case that a burr or flashing remains about some portion of the raw casting as a result of the joint in the casting mold. It is well-known to remove such burrs or flashings from the raw castings by trimming them with grinding wheels or other cutting tools wherein either the workpiece or the tool is guided by hand so that the tool follows the basic contour of the workpiece and removes only the flashing therefrom.

Because of the fact that this trimming operation requires a great deal of hand labor, attempts have been made to automate the process using such devices as industrial robots. In this technique, a grinding tool is attached to the arm of a robot and is guided along the workpiece by a previously programmed control so that the joint flashing is ground away. The programming of this control is accomplished in a teaching process wherein individual points of the contour of a sample workpiece are approached by the tool and numerical data representing the contour points are stored. The intermediate values required for moving the tool around the workpiece are determined by a computer which forms an integral part of the control system for controlling the movements of the tool. When an apparatus of this type is used, each new workpiece, having a new contour, requires a new "break-in" or instructional process and corresponding storage capacities. Also, slight variations in contours between workpieces, even those which are basically the same workpieces, and also the slight lack of precision in the positioning of the workpieces cannot be detected by a control of this type, and, as a result, a procedure using a machine of this type results in an imperfect removal of the burr or flashing. In addition, such an arrangement requires a considerable capital investment and a further considerable expenditure of time for the "learning" process as a result of which the trimming process, despite the saving of labor costs, is nevertheless quite expensive.

A different type of system, somewhat less relevant, employs a grinding disc controlled by an optical-electric pattern following control in which the grinding head moves in accordance with the movement of an optical device which follows a pattern having a basic contour similar to the workpiece. This kind of machine is used for outside contours of workpieces produced in large quantity such as, for example, crankshafts, camshafts, etc., and likewise has the previously mentioned disadvantages.

Trimming machines with punching attachments with which whole contours or partial contours are trimmed in one operation have also been known. This process is similarly suitable only for workpieces which are produced in large quantity.

BRIEF DESCRIPTION OF THE INVENTION

It is an object of the present invention to provide a process and apparatus for trimming workpieces, especially castings which are quite variable in shape, for the removal of burrs, flashings or fins from both outside and inside contours automatically up to the basic contour of the workpiece by means of a cutting tool and a simple control in an economic manner.

A further object is to provide a method and apparatus for accomplishing the trimming wherein the basic contour of the workpiece is scanned directly by the trimming tool during the trimming operation.

The apparatus needed to carry out the process includes a two-dimensional electromechanical copying control with a tracer and a master pattern wherein, according to the invention, the trimming tool is developed also as a tracer and the pattern is the basic contour of the workpiece.

Briefly described, the invention includes a method of trimming a predetermined portion of a workpiece adjacent to a major surface contour of the workpiece, comprising the steps of moving a trimming tool relative to the workpiece in a direction to remove the desired portion, detecting strain in the trimming tool during trimming as a measure of proximity of the tool to the major surface contour thereof, and controlling the location of the trimming tool relative to the surface as a function of the detected strain.

The invention also contemplates an apparatus for trimming a predetermined portion of a workpiece adjacent a major surface contour of the workpiece comprising means for supporting the workpiece; a trimming tool; means for supporting said trimming tool; means for imparting cutting motion to said trimming tool; means for moving said trimming tool into cutting contact with the predetermined portion and into contact with the major surface contour; means operatively associated with said tool for detecting force on said tool resulting from contact of a portion of said tool with said surface and for producing a signal representative of said force; and means responsive to said signal to control said means for moving, whereby said trimming tool is caused to follow said major surface contour as a guiding pattern.

In order that the manner in which the foregoing and other objects are attained in accordance with the invention can be understood in detail, particularly advantageous embodiments thereof will be described with reference to the accompanying drawings, which form a part of this specification, and wherein:

FIG. 5 is an enlarged partial side elevation of a further embodiment of a trimming tool in accordance with the invention;

FIGS. 6 and 7 are enlarged partial side elevations of further embodiments of trimming tools usable in the apparatus of FIGS. 1 and 5;

FIG. 8 is a partial side elevation of yet another embodiment of an apparatus in accordance with the invention; and FIG. 9 is an enlarged partial side elevation of a still further embodiment of a trimming tool in accordance with the invention.

DETAILED DESCRIPTION OF THE DRAWINGS

Figure 1:
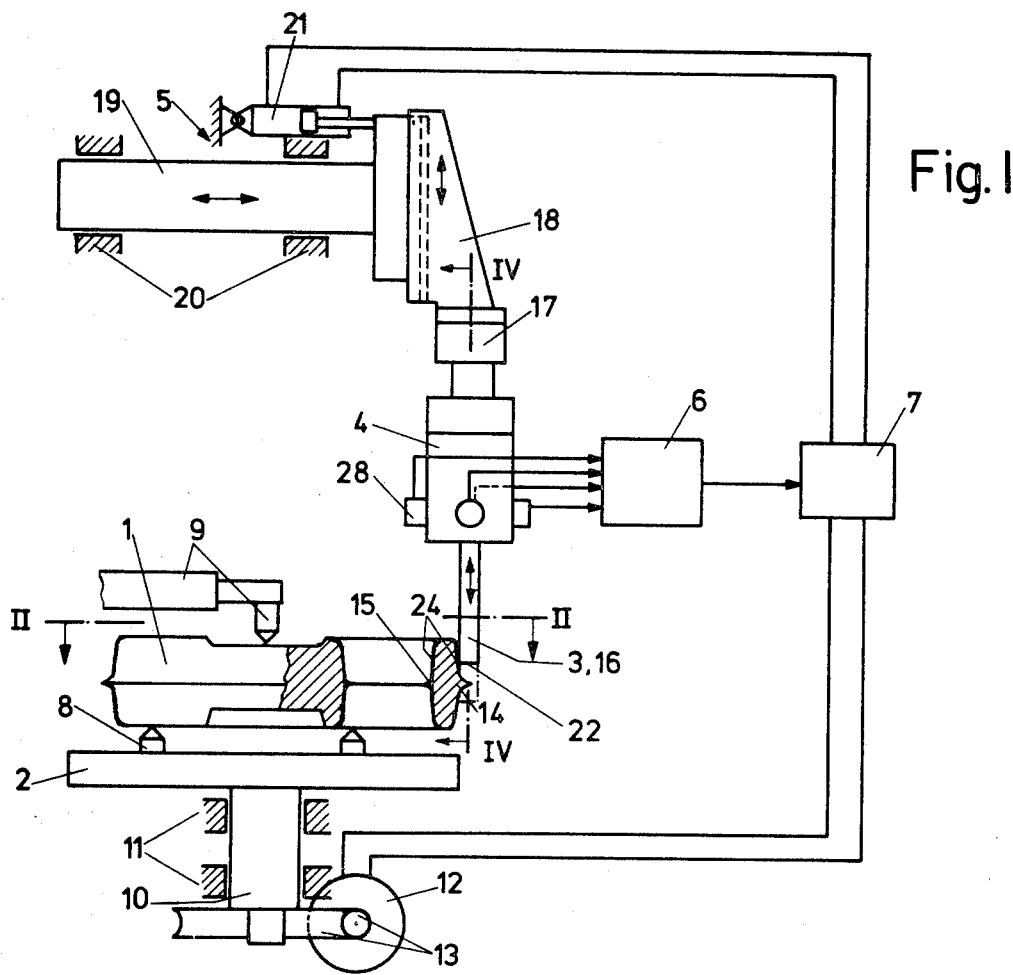
FIG. 1 is a schematic side elevation of an apparatus in accordance with the invention showing, schematically and partially in block form, a control apparatus used in conjunction therewith.

FIG. 1 shows the overall arrangement of an embodiment of an apparatus for trimming workpieces 1, the apparatus including a supporting table 2 which, in this embodiment, is formed as a rotatable table, and a trimming tool 3 which is supported in a scanning head 4, the apparatus also including an adjusting arrangement 5 for the approach movement of trimming tool 3. The apparatus thus shown also includes an electric control 6 and a hydraulic control 7.

Supporting table 3 has three pointed supports 8 against which the workpiece 1 is pressed by a clamping arrangement 9, thus locking the workpiece in a desired position on table 2. Workpieces with a smooth lower support surface may alternatively be clamped down by means of a magnetic plate.

Figure 2:
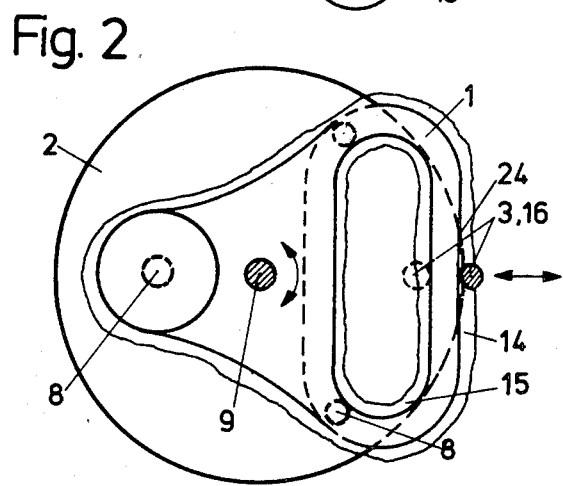
FIG. 2 is a partial plan view along line II—II of FIG. 1.

The support table 2 is mounted on a shaft 10 rotatably supported in bearings indicated at 11, and can be rotatably driven by a hydraulic motor 12 and a worm gear drive 13, shown only schematically, in both rotational directions. The workpiece 1 shown in FIGS. 1 and 2 is a raw casting and has an outside burr, fin, flange or flashing 14 around the periphery of the workpiece and an inside burr or flashing 15 on the interior contour of the elongated opening, flashings 14 and 15 being those which are to be removed by the apparatus of the invention.

In the case of the embodiment shown in FIGS. 1–4, the trimming or deburring tool 3 is an impact or pushing tool 16 which oscillates in a direction which is substantially perpendicular to the plane of the burr itself. The movement of tool 16 is thus a stroking movement, somewhat in the nature of a chisel, in the direction of the doubleheaded arrow and is produced by a hydraulic piston and cylinder apparatus 17 which is caused to repetitively reciprocate and which operates at a frequency within the range from 15 to 40 cps, and preferrably at about 25 cps. Hydraulic assembly 17 is mounted on a support 18 and carries scanning head 14, the support 18 being adjustable in a direction parallel to the direction of stroking movement of tool 16. Thus, the trimming tool can be adjusted in height relative to the location of the burrs 14 and 15 by adjusting support 18. Furthermore, the support 18 is mounted on an adjusting arrangement 5 which includes a cross slide 19 which is shiftable by means of a shifting cylinder 21 in guides 20, substantially free of play, in a direction which is generally perpendicular to the rotational center of supporting table 2. The shifting cylinder 21 and the hydraulic motor 12 are controlled by electrically operated servo valves which are disposed in the hydraulic control 7 and which receive their control signals from the electric control unit 6. An electric control circuit suitable for this purpose is described for example in U.S. Pat. No. 3,292,495.

It will be recognized that, instead of using a supporting table 2 which is rotatable about a substantially fixed axis, it is possible to support the table 2 in a way that permits it to be linearly movable in a horizontal plane, transversely to the direction of movement of the shifting arrangement 5, and it is also possible to combine a trimming tool which is not shiftable with a supporting table which has compound movements, or else a trimming tool which is movable on a cross slide in a direction perpendicular to the plane of the drawing. Also, it will be recognized that electromechanical drives can be used for moving the components.

The impact trimming tool 16, which preferably has a round cross section, and which is supported in the scanning head 14, has a cutting edge 22 for the removal of the burrs 14 and 15, the cutting edge 22 also performing the function of scanning for the basic contour 24 of the workpiece. The trimming tool 3, 16, workpiece 1, scanning head 4 and the electric control 6 form a two-dimensional copying or pattern following control of a type known per se, e.g. from the above-mentioned U.S. Pat. No. 3,292,495, with the particular distinctions, however, that the trimming tool 3, 16 simultaneously forms the pattern following scanner and also the basic contour 24 of the workpiece 1 forms the pattern to be followed.

Figure 3:
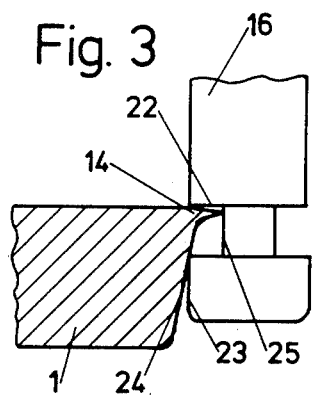
FIG. 3 is an enlarged partial side elevation, in partial section, of a further embodiment of a trimming tool usable in the apparatus of FIG. 1.

FIG. 3 shows a further embodiment of an impact or pushing type of trimming tool 16, usable in the manner shown in FIG. 1, which is used for the trimming of workpieces wherein the burr or flashing is disposed along the upper edge of the basic contour 24 of the workpiece. The cutting edge 22 in this case is disposed along an annular recess 25 of the impact tool and a cylindrical portion 23, required for performance of the scanning function in this embodiment, is disposed below recess 25 at the distal end of the tool.

Figure 4:
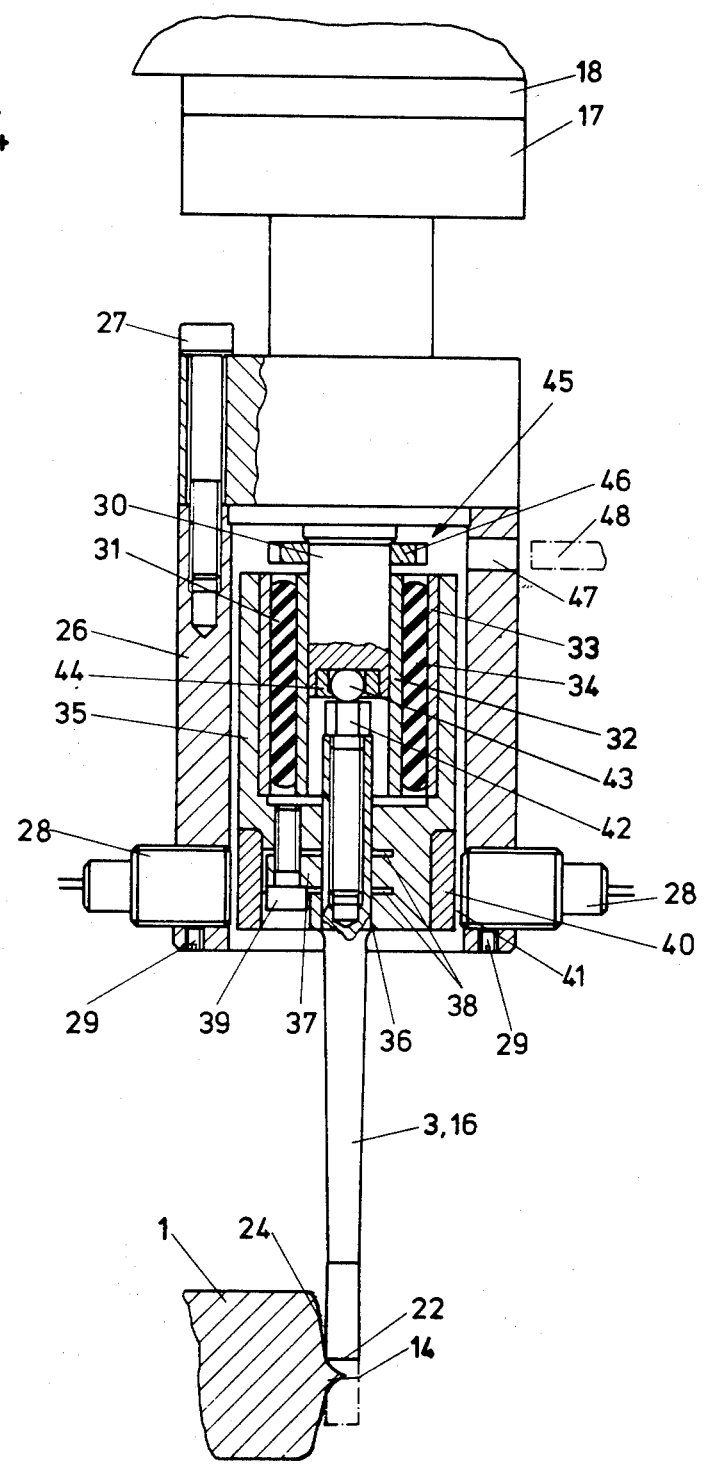
FIG. 4 is an enlarged front elevation along line IV—IV of FIG. 1.

FIG. 4 shows an enlarged vertical section through the scanning head 4 of FIG. 1 with the impact tool 16. The scanning head 4 has a cylindrical housing 26 which is fixedly attached to the cylinder portion of hydraulic assembly 17 by screws 27. At the lower end of housing 26 are contactless measuring elements 28, preferably four in number, angularly separated by 90°. Non-contact displacement pickups of the type "T 10", sold by Hottinger Baldwin Messtechnik GmbH, Darmstadt/Germany Federal Republic, may be preferrably used as elements 28, or also an arrangement designed as "linear variable differential transformer", described in connection with FIGS. 4 and 6 of said U.S. Pat. No. 3,292,495. Elements 28 are disposed in threaded bores through housing 26 and are secured by clamping screws 29. An elastic joint bearing 31, which in the example shown consists of a rubber sleeve 34 pressed between an inside pipe 32 and an outside pipe 33, is disposed around piston rod 30 of the hydraulic assembly 17. On the outside pipe 33 a holding sleeve 35 is forced on which, at its lower end, has a bore 36 coaxial to outside pipe 33 and a clamping arrangement 37 for the attachment of the impact tool 16 thereto. The clamping arrangement 37 consists of two slits 38 which extend transversely to the bore 36 and a clamping screw 39 by which the impact tool 16 is clamped in the bore 36. In the area of the clamping arrangement 37, a ring 40, made of steel, is forced onto the holding sleeve 35 which, together with the measuring elements 28, forms a gap 41. The theaded engagement between measuring elements 28 and their respective bores is formed using a fine thread by means of which the width of gaps 41 can be adjusted precisely. Elements 28 are proximity sensors which produce an electrical signal which varies in accordance with variations in the distance between the elements and ring 40 which is spaced from elements 28 by gap 41.

The impact tool 16 has, at its upper end, a replaceable set screw 42, the heat treated (case hardened) front surface of which forms the support for a ball 43. Ball 43 is guided in a ring 44 and thus is disposed between the end of piston rod 30 and set screw 42 of the impact tool 16 in such a way that its center lies in the middle of rubber sleeve 34, providing a perfect transmission of the pushing movement even in the event of deflection of the end of pushing tool 16. Even when the piston rod or the impact tool is rounded at the end, the impact force can be transmitted directly from the piston rod to the impact tool. The original position of the cutting edge 22 in the case of resharpened tools can be kept constant by the set screw 42. The joint bearing 31 may also be a ball-and-socket joint assembly wherein pre-tensioned springs are arranged in order to achieve a return of the processing tool operating as a scanner. The rubber sleeve 34 additionally has the advantage that oscillations of the impact tool are dampened. It is also possible to attach the rubber sleeve 34 with the outside pipe 33 on the piston rod 30 and to arrange the clamping device 37 with the ring 40 on the inside pipe 32.

In order to achieve uniform wear of the preferably round cutting edge 22, the impact tool 16, together with the piston rod 30 can be twisted intermittently at certain predetermined time intervals by means of a twisting apparatus 45. In the embodiment shown, this is accomplished by a ratchet wheel 46, disposed on piston rod 30, and by a pestle 48 which can be slidably mounted through bore 47 of the cylindrical housing 26. Also, instead of the impact tool 16, a filing tool, operating with the same oscillating motion, can be used which, in the case of tough material, removes the burr more advantageously under certain circumstances. It is also possible to combine an impact tool with a filing tool for certain materials.

The method of operation of trimming of workpieces by means of the arrangement shown in FIGS. 1–4 is as follows. The impact tool 16 is moved up to the workpiece 1 with an oscillating stroke by a feed movement of the cross slide 14 with simultaneously knocking off of the burr 14 until the impact tool 16, acting as a tracer, touches the base contour 24 of the workpiece 1 with its cutting edge 22 or with the follower 23, and a deflection of the impact tool 16, mounted resiliently in rubber sleeve 34, takes place. As a result, the width of gap 41 between the ring 40 and the contactless measuring elements 28 is changed. It will be recognized that as ring 40 moves toward a sensor at one side, it will move away from a sensor at the other side. The change in this gap is therefore not uniform with respect to the measuring elements which produce a distinctive set of electrical signals to be transmitted to electric control unit 6 which then produces control commands which are fed to the servo valves of the hydraulic control 7.

As a result of these commands, the crossfeed is stopped and by switching on of the hydraulic motor 12, the support table is driven in a direction through which the trimming of the periphery of the workpiece is introduced by a scanning process of the base contour of the workpiece with the impact tool operating simultaneously as a scanner. The movement of the support table 2 and of the cross slide 19 takes place as the result of the control of the drives 12 and 21, by means of the measuring elements 28, disposed in the scanning head 4 and by the control units 6 and 7 analogously to the known two-dimensional electrical copying controls.

As will be recognized, inside burrs or flashings 15 on inside contours of a workpiece, such as a bore, elongated hole, recess, or the like, may be removed by a process corresponding to that described above by the impact tool 16 which can easily be provided with a small diameter relative to the opening to be trimmed.

Rotating deburring tools, such as, for example, grinding wheels or milling cutters can also be used as trimming tools 3 as will be seen from the embodiments of FIGS. 5–7.

FIG. 5 shows a scanning head 4 corresponding to that of FIG. 4 with a grinding tool 51 or a milling tool 52 driven by a driving motor 50, preferably a pneumatically driven motor. The cylindrical housing 26 of the scanning head 4 is fixedly and directly connected with a vertically adjustable support 18a which, in the manner of FIG. 1, is disposed on a cross slide 19. The inside pipe 32 of the rubber sleeve 34 is fixedly attached with a holding bolt 53 to support 18a. In the bore 36 of the holding sleeve 35, disposed on the outside of pipe 33, mounting 54 of the driving motor 50 is attached by means of the clamping arrangement 37. The driving motor 50 has a rotating spindle 55 on which the grinding or milling tool 51 or 52 is attached. A cylindrical member 23a is mounted on spindle 55 to ride against and act as a scanning member of the basic contour 24 of the workpiece 1. In order to reduce friction, member 23a can be formed as a ring which is rotatably mounted by means of a roller bearing on spindle 55. Alternatively, it is possible to form member 23a as a non-rotating part such as a pipe firmly connected with the driving motor 50.

Thus, in the case of the scanning process, the spindle 55 together with the driving motor 50 is laterally deflected by contact with surface 24 of the workpiece so that the control commands for the drives 12 and 21 (as shown in FIG. 1 and as already described) are triggered by the change of the gap 41 between ring 40 and measuring elements 28. The stiffness of the rubber sleeve 34, in this embodiment, must be selected to be greater when the trimming is accomplished by a milling cutter, the elastic stiffness being a function of the radial component of the cutting force.

It is also possible for the scanning function to be carried out by the grinding or milling tool 51 or 52, omitting part 23a, in which case, in order to achieve the neat removal of a burr or flashing 14 or 15 down to the basic contour 24, the speed of feed is adapted such that the cutting forces correspond to the elastic rigidity of the rubber sleeve 34.

With the arrangement described in conjunction with FIG. 5, it is possible, in the case of a finished workpiece 1a, to remove the burrs developing as a result of processing at the edges or on the periphery or in the case of bores or other recesses, and also to chamfer the edges of the workpiece.

As will be seen from FIGS. 6 and 7, milling tools 52a and 52b, developed in the shape of a truncated cone, can be used for the chamfering wherein, at the side of the smaller diameter of the milling cutter, the cylindrical member 23a is mounted to act as a tracer or surface following member. In this case, it is possible to trim the upper edge 56 of a workpiece 1a as shown in FIG. 6 and to trim and/or chamfer the lower edge 57 as shown in FIG. 7 and to obtain a uniform chamfer by following the basic contour 24 with cylindrical member 23a. The size of the chamfer is controlled by adjustment of the support 18a as to height.

FIGS. 8 and 9 show two variations of a further embodiment of the measurement of the deflection of the trimming tool 3, required for the control of drives 12 and 21, in which embodiments the trimming tool is an impact tool 16 similar to that shown in FIGS. 1–4. A holding element 61, which is analogous to holding sleeve 34 of FIG. 4, has a bore 36 and the clamping device 37, by means of which the impact tool is attached, is fastened to the piston rod 30 of the hydraulic cylinder 17.

The energy of the push of the hydraulic cylinder 17 is transmitted, as has been previously described, from the piston rod 30 to th ball 43 and the adjustable set screw 42 to the impact tool 16. At the periphery of the holding element 61 there are at least two, and preferably four, stress measuring strips, such as strain gauges, which are mutually angularly separated by 90°. The deflection of the impact tool 16 during the scanning process takes place by elastic distortion. As a result of the bending stresses resulting in the tool and in the holding element 61, proportional electrical signals are produced in the strain gauges 60 which are converted in the control 6 into control signals for the drives 12 and 21.

As shown in FIG. 9, the strain gauges 60 may also be attached directly to the impact tool, in which case the cutting edge 22 is preferably formed on a replaceable component 62.

It will be recognized that the deflection of the rotating trimming tools shown in FIGS. 5-7 may also be measured by means of strain gauges which would then be disposed on a fixed portion of the apparatus. The mechanical portions of the arrangement for trimming of the workpieces is simplified by the use of strain gauges.

Raw castings of various shapes, even those which are produced in relatively small quantities or as individual pieces, may be trimmed economically by the use of the process of the invention and with the arrangements described herein wherein the trimming depends on the basic outer shape of the produced part. As a result, the differences in the dimensions of the individual workpieces which result in castings formed through molding and pouring are taken into consideration during the trimming process so that uniformly trimmed raw castings are produced dependent only upon the relevant contour.

By means of the impact or pushing tools with a small cross section, it is also possible to trim burrs or flashings at inside contours which have relatively small openings and contours with both inside and outside corners, which operations could hitherto only be accomplished by hand.

The operating process with rotating milling and grinding tools additionally permits the touching up of already processed workpieces at outside and inside contours. The arrangement of the invention excels because of very simple and study construction and makes a fully automatic operation possible.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for trimming a predetermined portion of a workpiece adjacent a major surface contour of the workpiece comprising
    means for supporting the workpiece;
    an elongated trimming tool having a transverse end surface defining a cutting edge at the distal end of the tool;
    means for imparting repetitively reciprocating longitudinal cutting motion to said trimming tool;
    means for moving said distal end of said trimming tool into cutting contact with the predetermined portion such that the side surfaces thereof repetitively contact the major surface contour;
    means supporting said tool and for detecting lateral force on said tool resulting from contact of a portion of said tool with said surface and for producing a signal representative of said force; and
    means responsive to said signal to control said means for moving, whereby said trimming tool is caused to follow said major surface contour as a guiding pattern.

2. An apparatus according to claim 1 wherein said trimming tool is an elongated member having a central axis and is deflectable in all directions perpendicular to said axis, and
    said means for supporting and detecting includes
    at least two force measuring elements disposed radially outwardly of said axis and angularly separated from each other by substantially 90°.

3. An apparatus according to claim 2 wherein said means for supporting and detecting said trimming tool includes
    a resilient bearing capable of permitting limited deflection of said tool,
    and each of said force measuring elements includes a proximity detector spaced from said tool by a gap, said detector being responsive to changes in the width of said gap to produce a signal.

4. An apparatus according to claim 3 wherein said resilient bearing includes
    first and second concentric metal sleeves, said tool being supported on one of said sleeves, and
    an elastomeric sleeve tightly fitted between said metal sleeves.

5. An apparatus according to claim 2 wherein said tool is deflected by elastic deformation, and wherein said force measuring elements are strain gauges mounted to be responsive to said elastic deformation.

6. An apparatus according to claim 1 wherein said means for supporting and detecting said tool includes a clamp to releasably engage said tool.

7. An apparatus according to claim 1 wherein said tool includes bearing surface means adjacent said cutting surface for contacting said major surface contour.

8. An apparatus according to claim 7 wherein said bearing surface means is mounted at the distal end of said tool and said cutting surface is disposed between said bearing surface means and said means for supporting and detecting.

9. An apparatus according to claim 1 wherein said means for reciprocating includes an hydraulic piston and cylinder assembly and means for causing said assembly to reciprocate at a frequency within the range of 15 to 40 cycles per second.

10. An apparatus according to claim 1 wherein said tool is generally circular in cross section, and wherein said means for imparting cutting motion further includes
    means for intermittently rotating said tool about its longitudinal axis.

* * * * *